United States Patent [19]

Ishikawa

[11] Patent Number: 5,132,907
[45] Date of Patent: Jul. 21, 1992

[54] CONTROL SYSTEM FOR CONTROLLING WHEEL SLIPPAGE WITH PROJECTION OF VEHICLE SPEED REPRESENTATIVE DATA

[75] Inventor: Yasuki Ishikawa, Tokyo, Japan

[73] Assignee: Nissan Motor Company, Limited, Yokohama, Japan

[21] Appl. No.: 735,772

[22] Filed: Jul. 29, 1991

Related U.S. Application Data

[63] Continuation of Ser. No. 256,632, Oct. 12, 1988, abandoned.

[30] Foreign Application Priority Data

Oct. 12, 1987 [JP]  Japan .................................. 62-257021

[51] Int. Cl.$^5$ .................................................. B60T 8/32
[52] U.S. Cl. .............................. 364/426.02; 364/565; 303/95; 303/97
[58] Field of Search ............... 364/426.01, 426.02, 364/565, 566; 303/95, 97, 103, 105, 109, 110; 180/197

[56] References Cited

U.S. PATENT DOCUMENTS

| | | | |
|---|---|---|---|
| 4,089,564 | 5/1978 | Öberg | 303/109 |
| 4,675,819 | 6/1987 | Fennel | 364/426.02 |
| 4,774,668 | 9/1988 | Matsubara et al. | 303/109 |
| 4,787,682 | 11/1988 | Muto | 364/426.01 |
| 4,802,711 | 2/1989 | Muto et al. | 303/109 |
| 4,807,941 | 2/1989 | Onogi et al. | 303/109 |
| 4,818,037 | 4/1989 | McEnnan | 303/109 |

Primary Examiner—Gary Chin
Attorney, Agent, or Firm—Foley & Lardner

[57] ABSTRACT

An anti-skid brake control system which employs a process of projection of vehicle speed representative dats based on selected higher one of data derived based on an integrated value which is derived by integrating vehicle body acceleration indicative data by time and data derived on the basis of wheel speed. In the present invention, vehicle speed representing data is periodically or cyclically reset and updated by the vehicle speed as an initial value of the vehicle speed representative data with that derived on the basis of the wheel speed. By selectively using the higher one of the vehicle speed representative data and periodically or cyclically updating the initial value of the vehicle speed representative data, a precision level of the vehicle speed representative level can be maintained high enough to precisely derive a wheel slippage for performing precise anti-skid control.

15 Claims, 2 Drawing Sheets

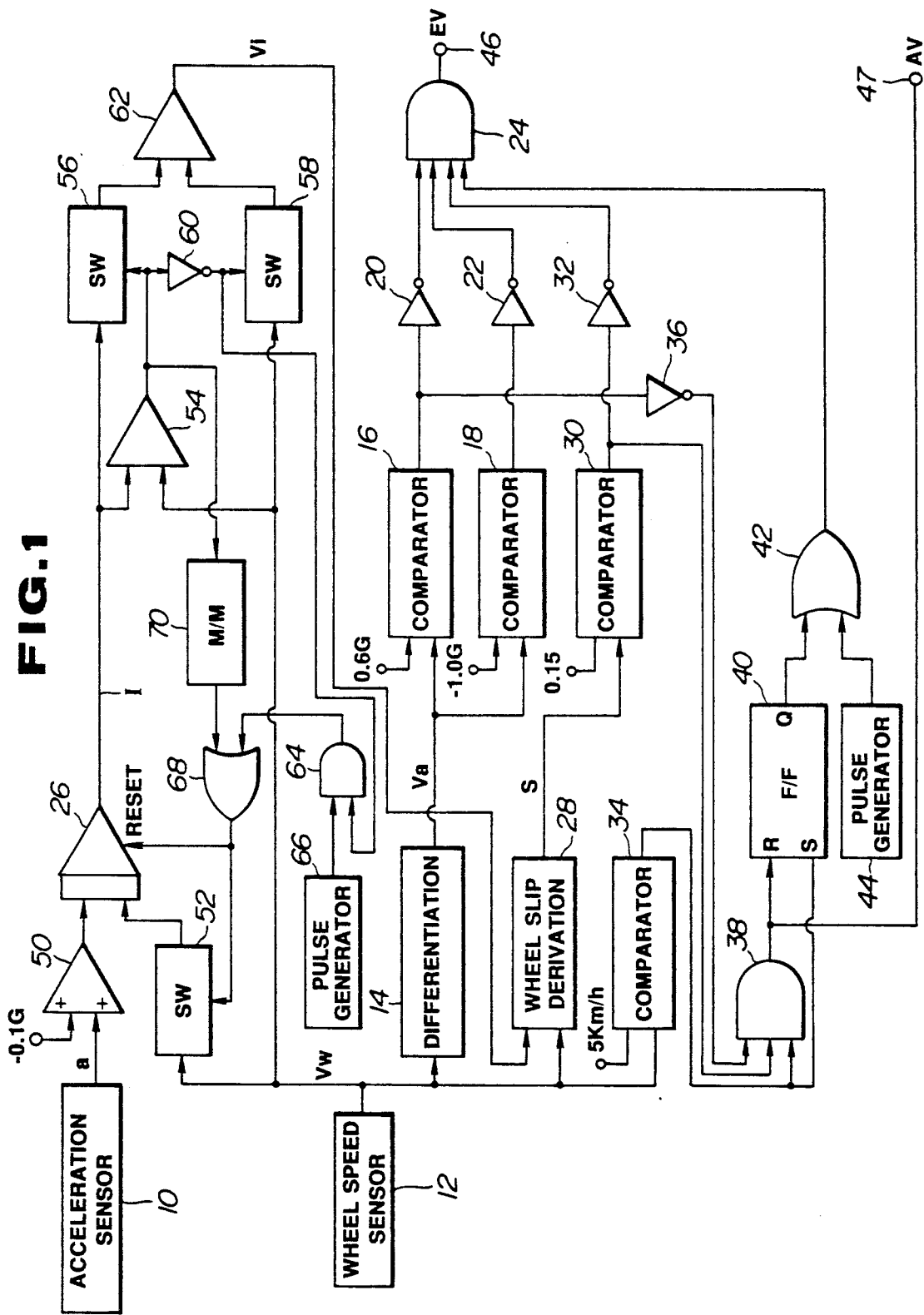

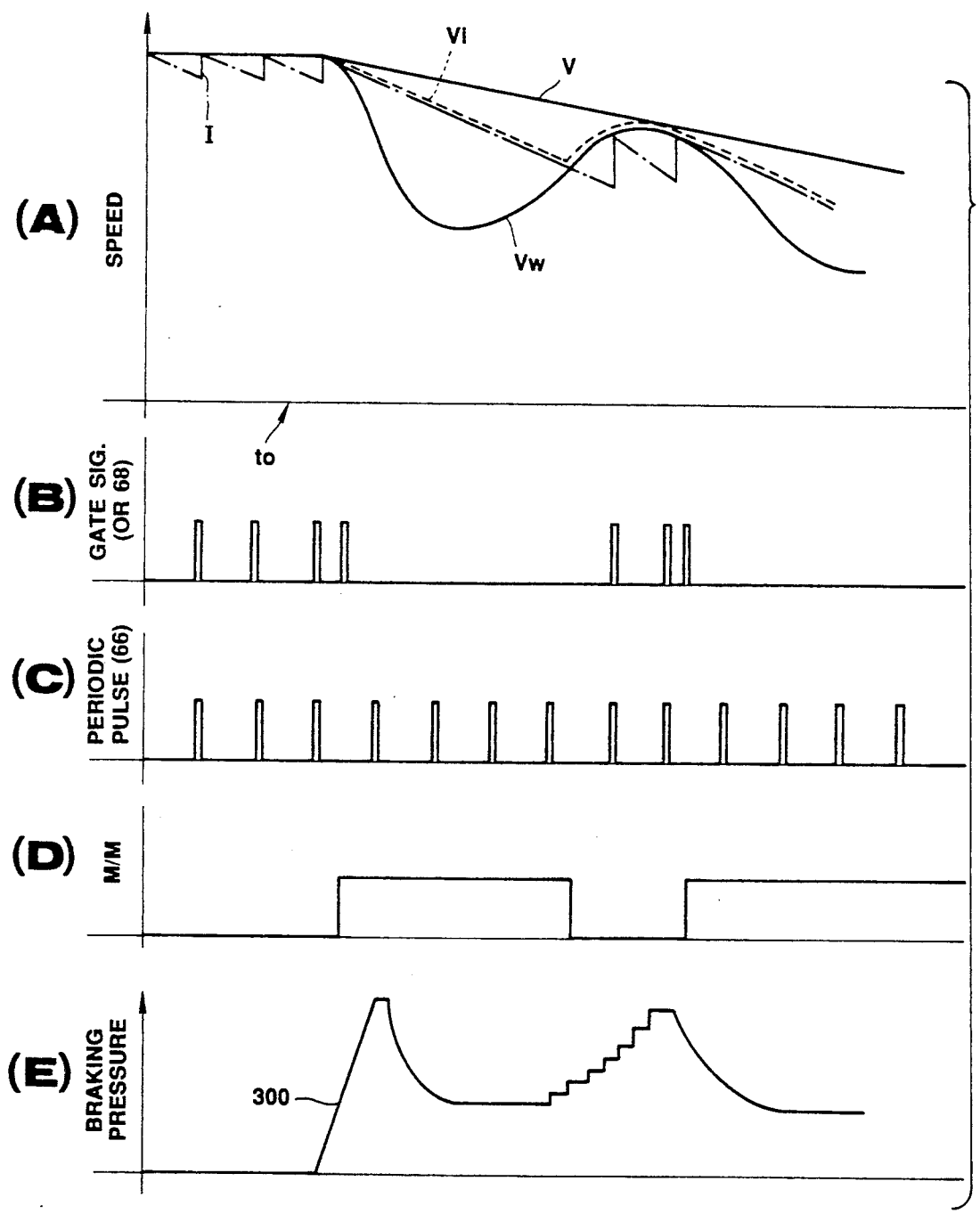

CONTROL SYSTEM FOR CONTROLLING WHEEL SLIPPAGE WITH PROJECTION OF VEHICLE SPEED REPRESENTATIVE DATA

This application is a continuation of application Ser. No. 07/256,632, filed Oct. 12, 1988 now abandoned.

BACKGROUND OF THE INVENTION

1. Field of the Invention

The present invention relates generally to a control system for controlling wheel slippage, such as an anti-skid control system for a brake system of an automotive vehicle and a traction control system for controlling driving torque to be distributed to vehicular wheels. More particularly, the invention relates to a projection of a vehicle speed representing data for facilitating wheel slippage dependent brake control, which projected vehicular speed representing data precisely correspond to an actual vehicle speed.

2. Description of the Background Art

One typical construction of an anti-skid brake control system is disclosed in Japanese Patent Second (examined) Publication (Tokko) Showa 51-6305. The disclosed anti-skid brake control system employs an acceleration sensor for monitoring an acceleration exerted on the vehicular body for producing an acceleration indicative signal, and a wheel speed sensor for monitoring rotation speed of the vehicular wheel for producing a wheel speed indicative signal. The system differentiate the wheel speed indicative signal to obtain an acceleration data for triggering anti-skid control while the wheel deceleration (negative value of acceleration) increases across a predetermined deceleration criterion, e.g. $-1.0$ G. Upon triggering anti-skid brake control, an instantaneous wheel speed indicative signal value is latched as a data representative of an initial value of a vehicular speed. The acceleration indicative signal produced by the acceleration sensor is fed to an integrator which becomes active when a vehicle speed becomes higher than a predetermined speed, e.g. 5 km/h. The integrator circuit integrates the acceleration indicative data by time to derive a vehicle speed variation indicative data. The vehicle speed variation data is added to the initial vehicular speed representative data latched upon initiation of the anti-skid brake control to derive a vehicle speed data projected based on the vehicular body acceleration. The projected data will be hereafter referred to as "projected vehicle speed data". The projected vehicle speed data is compared with the instantaneous wheel speed indicative signal value to derive a wheel slippage.

As is well known, anti-skid brake control is performed through a known process to hold braking pressure constant (HOLD mode) when wheel deceleration increases below the deceleration criterion; to decrease braking pressure (RELEASE mode) when the wheel slippage increases across a predetermined wheel slippage criterion, e.g. 15%; to hold the braking pressure (HOLD mode) when the wheel acceleration increases across a predetermined wheel acceleration criterion, e.g. +0.6 G; and to increase braking pressure (APPLICATION) mode when wheel slippage is decreased across the wheel slippage criterion.

In the process set forth above, it is essential to precisely obtain the projected vehicular speed for obtaining high precision in derivation of precise value of wheel slippage. However, prior processes tend to accumulate error in detection of vehicular body acceleration, to cause substantial error in derivation of the vehicular speed variation indicative data and, thus, tend to cause substantial error in the derivation of the wheel slippage. Therefore, such prior proposed systems have not been satisfactorily precise in performing anti-skid brake control at a sufficient precision level.

SUMMARY OF THE INVENTION

Therefore, it is an object of the present invention to provide a process of derivation of a projected vehicular speed data with satisfactorily high precision for utilizing the derived value in anti-skid brake control.

In order to accomplish the above-mentioned and other objects, an anti-skid brake control system, according to the present invention, employs a process of projection of vehicle speed representative data based on a selected higher one of a data derived based on an integrated value which is derived by integrating a vehicle body acceleration indicative data by time and a data derived on the basis of wheel speed. In the present invention, the vehicle speed representing data is periodically or cyclically reset and updated by the vehicle speed as an initial value of the vehicle speed representative data with that derived from the wheel speed. By selectively using higher one of the vehicle speed representative data and periodically or cyclically updating initial value of the vehicle speed representative data, precision level of the vehicle speed representative level can be maintained high enough to precisely derive wheel slippage for performing precise anti-skid control.

According to one aspect of the invention, a system for projecting a data which is representative of a vehicular speed for performing slip control of an automotive vehicle, comprising:

a wheel speed sensor for monitoring a rotation speed of vehicular wheel to produce a wheel speed indicative signal;

a vehicle acceleration sensor for monitoring an acceleration exerted on a vehicular body to produce a vehicular acceleration indicative signal;

first means for deriving a wheel acceleration data on the basis of the wheel speed indicative signal;

second means for projecting a vehicular speed representative data selectively based on the wheel speed indicative signal and the vehicular acceleration indicative signal, the second means integrating the vehicular acceleration indicative signal by time and deriving the projected vehicular speed representative data by adding the integrated value to an initial value, and the second means periodically updating the initial value with an instantaneous wheel speed indicative signal value; and third means for deriving wheel slippage data on the basis of the projected vehicular speed representative data and the wheel speed indicative signal value.

According to another aspect of the invention, a system for projecting a data which is representative of a vehicular speed for performing slip control of an automotive vehicle, comprises:

a wheel speed sensor for monitoring a rotation speed of vehicular wheel to produce a wheel speed indicative signal;

a vehicle acceleration sensor for monitoring an acceleration exerted on a vehicular body to produce a vehicular acceleration indicative signal;

first means for deriving a wheel acceleration data on the basis of the wheel speed indicative signal and providing a predetermined magnitude of offset from a value derived on the basis of the wheel speed indicative signal;

second means for projecting a vehicular speed representative data selectively based on the wheel speed indicative signal and the vehicular acceleration indicative signal, the second means integrating the vehicular acceleration indicative signal by time and deriving the projected vehicular speed representative data by adding the integrated value to an initial value, and the second means periodically updating the initial value with an instantaneous wheel speed indicative signal value; and third means for deriving wheel slippage data on the basis of the projected vehicular speed representative data and the wheel speed indicative signal value.

According to a further aspect of the invention, an anti-skid control system for an automotive brake system, comprising:

a hydraulic circuit for building up braking pressure in response to depression of an automotive brake, the circuit being operable to increase braking pressure in a first mode position and to decreasing braking pressure in a second mode position;

a wheel speed sensor for monitoring a rotation speed of vehicular wheel to produce a wheel speed indicative signal;

a vehicle acceleration sensor for monitoring an acceleration exerted on a vehicular body to produce a vehicular acceleration indicative signal;

first means for deriving a wheel acceleration data on the basis of the wheel speed indicative signal;

second means for projecting a vehicular speed representative data selectively based on the wheel speed indicative signal and the vehicular acceleration indicative signal, the second means integrating the vehicular acceleration indicative signal by time and deriving the projected vehicular speed representative data by adding the integrated value to an initial value, and the second means periodically updating the initial value with an instantaneous wheel speed indicative signal value;

third means for deriving wheel slippage data on the basis of the projected vehicular speed representative data and the wheel speed indicative signal value; and fourth means for deriving control signal for selectively operating the hydraulic circuit in the first mode position and the second mode position on the basis of the wheel speed indicative data, the wheel acceleration indicative data, the projected vehicular speed indicative data and the wheel slippage data so as to maintain wheel slippage at a predetermined optimal value.

According to a still further aspect of the invention, an anti-skid control system for an automotive brake system, comprises:

a hydraulic circuit for building up braking pressure in response to depression of an automotive brake, the circuit being operable to increase braking pressure in a first mode position and to decreasing braking pressure in a second mode position;

a wheel speed sensor for monitoring a rotation speed of vehicular wheel to produce a wheel speed indicative signal;

a vehicle acceleration sensor for monitoring an acceleration exerted on a vehicular body to produce a vehicular acceleration indicative signal;

first means for deriving a wheel acceleration data on the basis of the wheel speed indicative signal and providing a predetermined magnitude of offset of the value of the wheel acceleration data from a value actually obtained on the basis of the wheel speed indicative signal;

second means for projecting a vehicular speed representative data selectively based on the wheel speed indicative signal and the vehicular acceleration indicative signal, the second means integrating the vehicular acceleration indicative signal by time and deriving the projected vehicular speed representative data by adding the integrated value to an initial value, and the second means periodically updating the initial value with an instantaneous wheel speed indicative signal value;

third means for deriving wheel slippage data on the basis of the projected vehicular speed representative data and the wheel speed indicative signal value; and fourth means for deriving control signal for selectively operating the hydraulic circuit in the first mode position and the second mode position on the basis of the wheel speed indicative data, the wheel acceleration indicative data, and the wheel slippage data so as to maintain wheel slippage at a predetermined optimal value.

The second means may compare wheel speed indicative signal value with a value derived by adding the integrated value to the initial value and select one of greater value as the projected vehicular speed representative data. The second means is responsive to the wheel speed indicative signal value increasing across the value derived by adding the integrated value to the initial value for updating the initial value. Furthermore, the second means includes a pulse generating means for producing a periodic signal for resetting the integrated value periodically and updating the initial value with the instantaneous wheel speed indicative value. In addition, the second means is responsive to increasing of the wheel speed indicative signal value across the value derived by adding the integrated value to the initial value for resetting the integrated value and updating the initial value with the instantaneous wheel speed indicative signal value.

BRIEF DESCRIPTION OF THE DRAWINGS

In the drawings:

FIG. 1 is a block diagram of the preferred embodiment of an anti-skid brake control system according to the present invention; and FIG. 2 is a timing chart showing operations performed by the preferred embodiment of the anti-skid brake control system of FIG. 1.

DESCRIPTION OF THE PREFERRED EMBODIMENT

Referring now to the drawings, particularly to FIG. 1, the preferred embodiment of an anti-skid brake control system employs an acceleration sensor 10 for monitoring an acceleration on a vehicle body and a wheel speed sensor 12 which monitors a rotation speed of a vehicular wheel. The acceleration sensor 10 produces a vehicular acceleration indicative signal representative of the monitored vehicular body acceleration. The wheel speed sensor 12 produces a wheel speed indicative signal Vw representative of the monitored vehicular speed.

The acceleration sensor 10 is connected to an adder circuit 50 to add a given offset value to the vehicular acceleration indicative signal value. In the shown embodiment, the given offset value is set at a value corresponding to $-0.1$ G. The adder circuit 50 is connected to an intergrator circuit 26. On the other hand, the wheel speed sensor 12 is connected to a switching circuit 52, a differentiation circuit 14, a wheel slippage derivation circuit 28 and a comparator circuit 34.

The switching circuit 52 is connected the integration circuit 26 to feed an initial vehicular speed representative data $Vi_{init}$, the manner of derivation of which will be discussed later.

The differentiation circuit 14 differentiates the input instantaneous wheel speed indicative signal Vw to derive a wheel acceleration indicative data Va. The differentiation circuit 14 is connected to a comparator circuit 16 which is also connected to a reference signal generator (not shown) which generates an acceleration threshold $acc_{ref}$. In the shown embodiment, the acceleration threshold $acc_{ref}$ is set at a value corresponding to 0.6 G. The differentiation circuit 14 is also connected to another comparator 18 which is connected to another reference signal generator (not shown) to received therefrom a deceleration threshold $-acc_{ref}$. In the shown embodiment, the deceleration threshold $-acc_{ref}$ is set at a value corresponding to $-1.0$ G. The outputs of the comparators 16 and 18 are connected to an AND gate 24 via inverters 20 and 22.

The wheel slippage derivation circuit 28 is connected to an adder circuit 62 in a projected vehicular speed data derivation circuit, details thereof will be set forth later. The wheel slippage derivation circuit 28 generally compares a projected vehicular speed indicative data Vi received from the adder circuit 62 with the wheel speed indicative data Vw received from the wheel speed sensor 12 to derive a wheel slippage indicative data S. The wheel slippage derivation circuit 28 feeds the wheel slippage indicative data S to a comparator circuit 30. The comparator circuit 30 receives a wheel slippage threshold $S_{ref}$ from a reference signal generator (not shown). In the practical embodiment, the wheel slippage threshold $S_{ref}$ is set at a value corresponding to 15% of wheel slippage. Similarly to the comparator circuits 16 and 18, the comparator circuit 30 is connected to the AND gate 24 via an inverter circuit 32. The AND gate 24 is, in turn, connected to an APPLICATION mode output port 46.

The comparator circuit 16 is also connected to an AND gate 38 via an inverter circuit 36. The inverter circuit 38 is also connected to the comparator 30 to receive the output thereof and to the comparator circuit 34. The comparator circuit 34 compares the wheeel speed indicative signal value Vw with a predetermined low vehicle speed criterion which is set at a value corresponding to 5 km/h in the shown embodiment. The output of the AND gate 38 is connected to a reset input terminal of a flip-flop 40. The set input terminal of the flip-flop 40 is directly connected to the comparator circuit 34 to receive the comparator output. The output of the flip-flop 40 is connected to an OR gate 42. The OR gate 42 is also connected top a pulse generator 44 which is designed to produce a predetermined frequency and predetermined pulse width of pulse signal. The output of the OR gate 42 is connected to the AND gate 42.

The output of the AND gate 38 is also connected to a RELEASE mode output terminal 47.

The integrator circuit 26 forms a part of the projected vehicular speed representative data derivation circuit for deriving the projected vehicular speed indicative data Vi. The integrator circuit 26 is connected to the adder circuit 62 via a switching circuit 56. On the other hand, the adder circuit 62 is also connected to the wheel speed sensor 12 via a switching circuit 58.

The integrator circuit 26 is further connected to a comparator circuit 54. The comparator circuit 54 is also connected to the wheel speed sensor 12. The comparator circuit 54 compares the integrated value I input from the integrator circuit 26 with the wheel speed indicative signal value Vw from the wheel speed sensor 12. The output of the comparator circuit 54 is directly connected to the switching circuit 56 and connected to the switching circuit 58 via an inverter. The output of the comparator 54 is connected to a monostable multivibrator 70 which is designed to be triggered by HIGH level comparator signal. The monostable multivibrator 70 is connected to an OR gate 68. The OR gate 68 is also connected to an AND gate 64 which has input terminals connected to the comparator circuit 54 and a pulse generator 66 respectively.

The operation of the circuit of the preferred embodiment of the anti-skid brake control system set forth above, will be discussed herebelow with reference to FIG. 2.

The comparator circuits 16 and 18 receive the wheel acceleration date Va with the deceleration threshold $-acc_{ref}$ and the acceleration threshold $acc_{ref}$. The output of the comparator 16 is maintained LOW while the wheel acceleration data Va is smaller than the acceleration threshold $acc_{ref}$ and turns into HIGH level when the wheel acceleration data becomes greater than or equal to the acceleration threshold. On the other hand, the comparator circuit 18 outputs LOW level signal while the magnitude of deceleration represented by the wheel acceleration data Va is maintained smaller than the deceleration threshold $-acc_{ref}$, and turns into HIGH level when the deceleration magnitude as represented by the wheel acceleration data Va becomes greater than or equal to the deceleration threshold. Therefore, the input to the AND gate 24 via the inverter 20 is maintained at HIGH level as long as the wheel acceleration Va is maintained smallest than the acceleration threshold. On the other hand, the input to the AND gate 24 via the inverter 22 is maintained at a HIGH level.

The comparator circuit 30 compares the wheel slippage S which is derived by the wheel slippage derivation circuit 28, with the wheeel slippage threshold $S_{ref}$ to output LOW level comparator signal while the wheel slippage S is maintained smaller than the wheel slippage threshold $S_{ref}$ and turns into HIGH level in response to the wheel slippage greater than or equal to the wheel slippage threshold.

The output of the comparator circuit 16 is also fed to the AND gate 38 via the inverter circuit 36. The AND gate 38 also receives the output of the comparator circuit 30. Furthermore, the AND gate 38 is connected to the output terminal of the comparator circuit 34 which compares with the wheel speed indicative data Vw of the wheel speed sensor 12 with the low vehicle speed criterion representing substantially low vehicular speed, e.g. 5 km/h, to produce LOW level signal while the wheel speed Vw is maintained lower than the low vehicle speed criterior and HIGH level signal as long as the wheel speed is maintained higher than the low vehicle speed criterion. Therefore, the AND gate 38 is maintained conductive when the output of the comparator circuit 16 input via the inverter circuit 36, the output of the comparator circuits 30 and 34 are maintained HIGH level. While maintained conductive, the AND gate 38 feeds HIGH level signal to the reset input terminal of the flip-flop 40 to reset the latter to maintain the input to the OR gate 42 LOW level. On the other hand, since the output of the comparator 34 is directly connected to the set input terminal of the flip-flop 40. The flip-flop 40 can be maintained set position as long as the input from the AND gate 38 is maintained LOW level.

With the shown arrangement, the OR gate 42 outputs constant HIGH level signal when the flip-flop 40 is in set position and outputs pulse signal having the predetermined frequency and predetermined pulse width as generated by the pulse signal generator circuit 44.

On the other hand, the output of the AND gate 38 is directly fed to the RELEASE mode output terminal 47 to be output therethrough as an outlet control signal AV. As will be appreciated, when the outlet control signal AV is maintained HIGH level, an outlet (AV) valve is maintain open to drain pressurized fluid in a wheel cylinder for reducing the braking force. On the other hand, when the signal level of the AND gate 38 is maintained LOW level, the outlet control signal AV is maintained LOW level to shut the AV valve.

With the arrangement set forth above, the AND gate 24 is maintained only when all three comparator signals of the comparator circuits 16, 18 and 20 are maintained HIGH level to output HIGH level signal as an inlet control signal EV via the APPLICATION mode output terminal 46. When one of the comparator signals received from the comparator circuits 16, 18 and 30 and OR gate signal of the OR gate 42 turns into LOW levle. The inlet control signal EV is fed to an inlet control valve (EV) not shown to control the valve position to keep the EV valve open when the inlet control signal EV is maintained at HIGH level and closed when the inlet control signal EV is held LOW level.

In order to derive the wheel slippage S, the integration circuit 26 of the projected vehicular speed representative data derivation circuit receives the vehicle acceleration indicative signal a with the given offset, e.g. $-0.1$ G and operates to integrate the vehicle acceleration indicative signal by time. The integrated value I of the integrator circuit 26 is compared with the wheel speed indicative signal value Vw in the comparator circuit 54. The comparator circuit 54 outputs HIGH level comparator signal when the integrated value I is greater than the wheel speed indicative signal value Vw. By the HIGH level comparator signal, the switching circuit 56 becomes conductive and the switching circuit 58 is held non-conductive. Therefore, the integrated value I is fed to the adder circuit 62. Since the switching circuit 58 is maintained non-conductive, the adder circuit 62 output the value corresponding to the integrated value I as the projected vehicular speed indicative data Vi. On the other hand, when the wheel speed indicative data Vw is greater than the integrated value I, the comparator signal of the comparator circuit 54 becomes LOW level. By the LOW level comparator signal, the switching circuit 56 becomes non-conductive and the switching circuit 58 becomes conductive. Therefore, the wheel speed indicative data Vw is fed through the switching circuit 58 to the adder circuit 62. Then, the wheel speed indicative data Vw is outputted as the projected vehicular speed indicative data Vi.

The comparator signal is fed to the monostable multivibrator 70. The monostable multivibrator 70 is triggered by the trailing edge of the HIGH level comparator signal of the comparator circuit 54. Therefore, the monostable multivibrator 70 is triggered when the integrated value I becomes smaller than the wheel speed indicative data Vw. The HIGH level signal of the monostable multivibrator 70 is fed to the OR gate 68. The OR gate 68 also receives the periodically generated pulse signal. Therefore, while the output signal of the multivibrator 70 is maintained at LOW level, HIGH level gate signal is output from the OR gate 68 periodically. On the other hand, when the monostable multivibrator 70 is triggered, HIGH level gate signal is outputted for a predetermined trigger period of the monostable multivibrator.

The integrator circuit 26 is reset by the leading edge of the HIGH level gate signal of the OR gate 68. Simultaneously, the switching circuit 52 is turned conductive by the leading edge of the HIGH level OR gate signal for feeding the wheel speed indicative signal to the integrator circuit 26. The integrator circuit 26 latches the wheel speed indicative data Vw as initial value for the integrated signal I.

As will be appreciated herefrom, the integrated value I is normally updated periodically at a frequency determined by the frequency of the pulse generated by the pulse generator 66. The integrated value I of the integrator circuit 26 is also updated when the integrated value varies to be smaller than the wheel speed indicative data Vw.

At the normal condition, the wheel slippage S is maintained smaller than the wheel slippage threshold $S_{ref}$, the wheel acceleration Va derived by differentiating the wheel speed indicative data Vw, is maintained greater than the deceleration threshold and smaller than the acceleration threshold. Therefore, the comparator signals of the comparator circuits 16, 18 and 30 are all maintained at LOW level to input HIGH level signals through the inverter circuits 20, 22 and 32. On the other hand, while the vehicular speed is maintained higher than the low vehicle speed criterion, the comparator signal of the comparator circuit 34 is maintained HIGH level to the input HIGH level signal. At this time, the LOW level comparator signal is input to the AND gate 38 from the comparator signal is input to the AND gate 38 from the comparator circuit 30. This causes the AND gate 38 non-conductive state despite HIGH level inputs from the comparator 16 via the inverter 36 and from the comparator circuit 34. Therefore, the input for the reset input terminal of the flip-flop 40 is maintained LOW level. The flip-flop is thus maintained at set position to input the HIGH level signal to the AND gate 24. Therefore, the inlet signal EV is maintained HIGH. On the other hand, by the LOW level input from the comparator 30. Since the AND gate 38 is maintained non-conductive to output LOW level gate signal as set forth above, the outlet signal AV is maintained at LOW level. By the HIGH level EV signal and the LOW level AV signal places the anti-skid brake control system at the APPLICATION mode position. At this APPLICATION mode position, the EV valve is maintained open to introduced pressurized fluid from hydraulic brake circuit including master cylinder, and the AV valve is shut to block fluid communication between the wheel cylinder and the return passage.

As seen from FIG. 2, while the brake is not applied to maintain the anti-skid brake control system in an APPLICATION mode position and vehicle is driven in normal condition, the HIGH level gate signal is produced periodically (as shown in B) in response to periodic pulse signal generated by the pulse generator (as shown C) for resetting and updating the integrated value I (as shown in A).

Supposing that, at a timing $t_0$ in FIG. 2, the brake is applied for deceleration of the vehicle, the braking pressure in the wheel cylinders increases as shown in (E). By increasing braking pressure, the wheel deceleration increases across the deceleration threshold $-acc_{ref}$. Therefore, the output signal of the comparator circuit 18 switched into HIGH level to input LOW level signal via the inverter circuit 22 to cause the AND gate 24 turning into non-conductive state to output the LOW level into control signal EV. At the same time, since the AND gate 38 is maintained non-conductive state by the LOW level input from the comparator circuit 30. Thus, the output control signal AV to be output from RELEASE mode output terminal 47. Therefore, the anti-skid brake control system is shifted into HOLD mode position. At this HOLD mode, both of the EV valve and AV valve are shut off to block fluid communication. Therefore, the braking pressure in the wheel cylinder is maintained constant.

By maintaining the braking pressure constant in HOLD mode position at the increased pressure, the wheel speed is further decreased to increase wheel slippage S as derived by the wheel slippage derivation circuit 28. When the wheel slippage S decreases across the wheel slippage threshold $S_{ref}$, the comparator signal for the comparator circuit 30 turns into HIGH level. At this time, the inputs from the comparator circuits 18 and 30 via the inverter circuits 22 and 32 are maintained LOW level to maintain the AND gate 24 non-conductive state. Therefore, LOW level inlet control signal EV is output through the APPLICATION mode output terminal. By turning the comparator signal of the comparator circuit 30 into HIGH level, AND condition of the AND gate 38 is established to make the AND gate 38 conductive. By HIGH level gate signal of the AND gate 38, the flip-flop 40 is reset. Then, the OR gate 42 periodically output HIGH level pulse signal having freggency and pulse width corresponding to the pulse frequency and pulse width of the pulse signal generated by the pulse signal generator 44.

On the other hand, the HIGH level gate signal of the AND gate 38 is output as the outlet control signal AV. Therefore, the operation mode of the anti-skid brake control system turns into RELEASE mode to maintain the EV value at shut off position and to switch the AV valve into open position. By this, the fluid communication between the wheel cylinder and return passage is established to reduce the braking pressure in the wheel cylinder.

By reducing the braking pressure in the RELEASE mode, wheel speed Vw increases to increase wheel acceleration Va. When the wheel acceleration Va increases across the acceleration threshold $acc_{ref}$, the comparator signal of the comparator circuit 16 turns into HIGH level. The HIGH level comparator signal 16 of the comparator circuit 16 causes destroying of the AND condition of the AND gate 38 to make the latter non-conductive. Therefore, the operation mode is again switched into HOLD mode to maintain the braking pressure constant at decreased level.

By maintaining the braking pressure constant at decreased level in the HOLD mode, the wheel slippage S is decreased across the wheel slippage threshold $S_{ref}$. Therefore, the comparator signal of the comparator circuit 30 turns into LOW level. Though the comparator signals of the comparator circuits 18 and 30 are thus held LOW level, the AND gate 24 is maintained non-conductive because of HIGH level comparator signal of dthe comparator circuit 16. Therefore, the operation mode is still maintained at the HOLD mode.

After increasing the wheel speed Vw at a level corresponding to the vehicular speed V, the wheel accleration Va decreases. When the wheel acceleration Va is decreased across the wheel acceleration threshold $ac_{ref}$, then the comparator signal of the comparator circuit 16 turns into LOW level to establish the AND condition of the AND gate 24. By this, the inlet control signal EV becomes HIGH level to shift the operation mode of the anti-skid control system into APPLICATION mode to start second skid control cycle which is similar to that set forth above.

It should be appreciated that, in the APPLICATION mode in the second and subsequent skid control cycles, the flip-flop 40 is maintained at reset condition until the wheel speed Vw drops below the low vehicle speed criterion. As long as the flip-flop 40 is maintained at reset position, the AND condition of the AND gate 24 is peridically established and destroyed by the periodic pulse signal of the pulse signal generator 44. Therefore, the braking pressure in the wheel cylinder is increased in stepwise fashion as shown in (E) of FIG. 2.

As will be appreciated herefrom, the shown embodiment can successfully avoid the influence of an error in detecting the vehicular acceleration in deriving the projected vehicular speed representative data. Therefore, the shown embodiment can achieve high precision in derivation of the wheel slippage and thus allow high precision level anti-skid control.

It should be note that while the present invention has been discussed in terms of the specific embodiment of the anti-skid brake control system, the process of derivation of the projected vehicular speed data is applicable for shown specific circuit but also for any of the anti-skil brake control circuits. Furthermore, the projection of the vehicular speed data may also be applicable for any slip control systems for automotive vehicle, such as traction control system for controlling power unit, e.g. an internal combustion engine, and/or power train, such as power transmission, differential gear unit and so forth. Therefore, the shown embodiment should be appreciated as mere example of implementation of the present inventio and thus the invention includes all of the implementation of the claimed feature in the appended claims.

What is claimed is:

1. A system for projecting a data which is representative of a vehicular speed for performing slip control of an automotive vehicle, comprising:
   a wheel speed sensor monitoring wheel speed to produce a wheel speed indicative signal;
   a vehicle acceleration sensor for monitoring an acceleration exerted on a vehicular body to produce a vehicular acceleration indicative signal;
   first means respondive to the vehicular acceleration indicative signal from said vehicle acceleration sensor to integrate it over time to provide an integrated value, said first means also being responsive to the wheel speed indicative signal from said wheel speed sensor to project a vehicular speed representative data based on the integrated value and an initial value which is provided by the wheel speed indicative signal as a value defining an initial speed magnitude of the projected vehicular speed representative data;

second means responsive to the wheel speed indicative signal having a value greater than that of the projected vehicular speed representative data to provide a signal indicative thereof;

third means responsive to the signal from said second means to provide an instantaneous wheel speed indicative signal from said wheel speed sensor to said first means as the initial value for projecting the vehicular speed representative data; and fourth means for deriving wheel slippage data on the basis of said projected vehicular speed representative data and a value of the wheel speed indicative signal.

2. A system as set forth in claim 1, wherein said second means is responsive to said wheel speed indicative signal value increasing across the value of the projected vehicular speed representative data to provide said signal to said third means.

3. A system as set forth in claim 2, wherein said second means includes a pulse generating means for producing a periodic signal for resetting said first means to update the initial value with a value of the instantaneos wheel speed indicative signal.

4. A system as set forth in claim 3, wherein said second means is responsive to said increasing of said wheel speed indicative signal value across the value of the projected vehicular speed representative data, to provide said signal to said third means in response to the periodic signal.

5. A system as set forth in claim 1, wherein said first means offsets a value of the vehicular acceleration indicative signal by a preselected negative value to provide and offset vehicular acceleration indicative signal, and integrates the offset vehicular acceleration indicative signal over time to provide the integrated value.

6. A system as set forth in claim 2, wherein said third means includes means for providing a periodic signal for resetting said first means to change the initial value to a value of the instantaneous wheel speed indicative signal when the value of the wheel speed indicative signal is greater than that of the projected vehicle speed representative data.

7. An anti-skid control system for an automotive brake system, comprising:

a hydraulic circuit for building up braking pressure in response to depression of an automotive brake, said circuit being operable to increase braking pressure in a first mode position and to decrease braking pressure in a second mode position;

a wheel speed sensor for monitoring a rotation speed of a vehicular wheel to produce a wheel speed indicative signal;

a vehicle acceleration sensor for monitoring acceleration exerted on a vehicular body to produce a vehicular acceleration indicative signal;

first means responsive to the vehicular acceleration indicative signal from said vehicle acceleration sensor to integrate it over time to provide an integrated value, said first means also being responsive to the wheel speed indicative signal from said wheel speed sensor to project vehicular speed representative data based on the integrated value and an initial value which is provided by the wheel speed indicative signal as a value defining an initial speed magnitude of the projected vehicular speed representative data;

second means responsive to the wheel speed indicative signal having a value greater than that of the projected vehicular speed representative data to provide a signal indicative thereof;

third means responsive to the signal from said second means to provide an instantaneous wheel speed indicative signal from said wheel speed sensor to said first means as the initial value for projecting the vehicular speed representative data;

fourth means for deriving wheel slippage data on the basis of said projected vehicular speed representative data and a value of the wheel speed indicative signal; and fifth means for deriving a control signal for selectively operating said hydraulic circuit in said first mode position and said second mode position on the basis of said wheel speed indicative signal, said wheel acceleration indicative signal, said projected vehicular speed indicative data and said wheel slippage data so as to maintain wheel slippage at a predetermined optimal value.

8. An anti-skid control system as set forth in claim 7, wherein said second means is responsive to said wheel speed indicative signal value increasing across the value of the projected vehicular speed representative data to provide said signal to said third means.

9. An anti-skid control system as set forth in claim 8, wherein said second means includes a pulse generating means for producing a periodic signal for resetting said first means to update the initial value with a value of the instantaneous wheel speed indicative signal 10. An anti-skid control system as set forth in claim 9, wherein said second means is responsive to said increasing of said wheel speed indicative signal value across the value of the projected vehicular speed representative data to provide said signal to said third means in response to the periodic signal.

11. A system as set forth in claim 7, wherein said first means offsets a value of the vehicular acceleration indicative signal by a preselected negative value to provide an offset vehicular acceleration indicative signal and integrates the offset vehicular acceleration indicative signal over time to provide the integrated value.

12. A system for projecting data indicative of a vehicle speed for carrying out anti-skid control of an automotive vehicle comprising:

a wheel speed sensor detecting wheel speed to provide a signal indicative thereof;

a vehicle acceleration sensor detecting acceleration acting on a vehicle body to provide a signal indicative thereof;

first means responsive to the signal from said vehicle acceleration sensor for offsetting a value of the acceleration by a preselected negative value to provide a signal indicative of an offset acceleration value;

second means responsive to the signal from said first means to integrate the offset acceleration value over time to provide an integrated value which defines a variation in vehicle speed, said first means also being responsive to the signal from said wheel speed sensor to project a vehicle speed representative data based on the integrated value and an initial value provided by the wheel speed which defines an initial speed magnitude of the projected vehicular speed representative data;

third means response to the signal from said wheel speed sensor which has a value greater than that of the projected vehicle speed representative data to provide a signal indicative thereof;

fourth means responsive to the signal from said third means to provide an instantaneous wheel speed detected by said wheel speed sensor to said second means as the initial value for projecting the vehicular speed representative data; and fifth means for deriving wheel slippage data on the basis of said projected vehicular speed representative data and the wheel speed signal detected by said wheel speed sensor.

13. A system as set forth in claim 12, wherein said third means is responsive to the wheel speed signal increasing across the value of the projected vehicular speed representative data to provide said signal to said fourth means.

14. A system for projecting data indicative of a vehicular speed to determine wheel slippage for performing slip control of an automotive vehicle comprising:

vehicle acceleration detecting means for detecting acceleration of a vehicle body for determining an acceleration value;

offset means for offsetting the acceleration value determined by said vehicle acceleration detecting means by a preselected constant magnitude;

vehicle speed projecting means for integrating said acceleration value offset by said offset means to project a vehicle speed;

wheel rotational speed detecting means for detecting rotational speed of wheel;

vehicle speed selecting means for selecting the greater of a value of the projected vehicle speed and a speed value determined by the rotational speed of the wheel as the vehicle speed;

integrating initial value setting means for setting the speed value determined by a rotational speed of the wheel as an initial value in the integrating operation of said vehicle speed projecting means periodically when the speed value determined by the rotational speed of the wheel is selected by said vehicle speed selecting means as the vehicle speed; and slippage calculating means for determining an amount of slippage of the wheel based on the selected vehicle speed and the detected rotational speed of the wheel.

15. An anti-skid control system for an automotive brake system comprising:

vehicle acceleration detecting menas for detecting acceleration of a vehicle body for determining an acceleration value;

offset means for offsetting the acceleration value determined by said vehicle acceleration detecting means by a preselected constant magnitude;

vehicle speed projecting means for integrating said acceleration value offset by said offset means to project a vehicle speed;

wheel rotational speed detecting means for detecting rotational speed of a wheel;

vehicle speed selecting means for selecting the greater of a value of the projected vehicle speed and a speed value determined by the rotational speed of the wheel as a vehicle speed;

integrating initial value setting means for setting the speed value determined by the rotational speed of the wheel as an initial value in the integrating operation of said vehicle speed projecting means periodically when the speed value determined by the rotational speed of the wheel is selected by said vehicle speed selecting means as the vehicle speed;

slippage calculating means for determining an amount of slippage of the wheel based on the selected vehicle speed and the detected rotational speed of the wheel; and brake hydraulic pressure control means for controlling an actuator for selectively increasing and decreasing pressure of a brake working fluid according to the amount of slippage determined by said slippage calculating means.

* * * * *